R. R. GRANT.
LANDING AND LAUNCHING SYSTEM FOR AEROPLANES.
APPLICATION FILED OCT. 6, 1913.
1,263,758.
Patented Apr. 23, 1918.
2 SHEETS—SHEET 2.
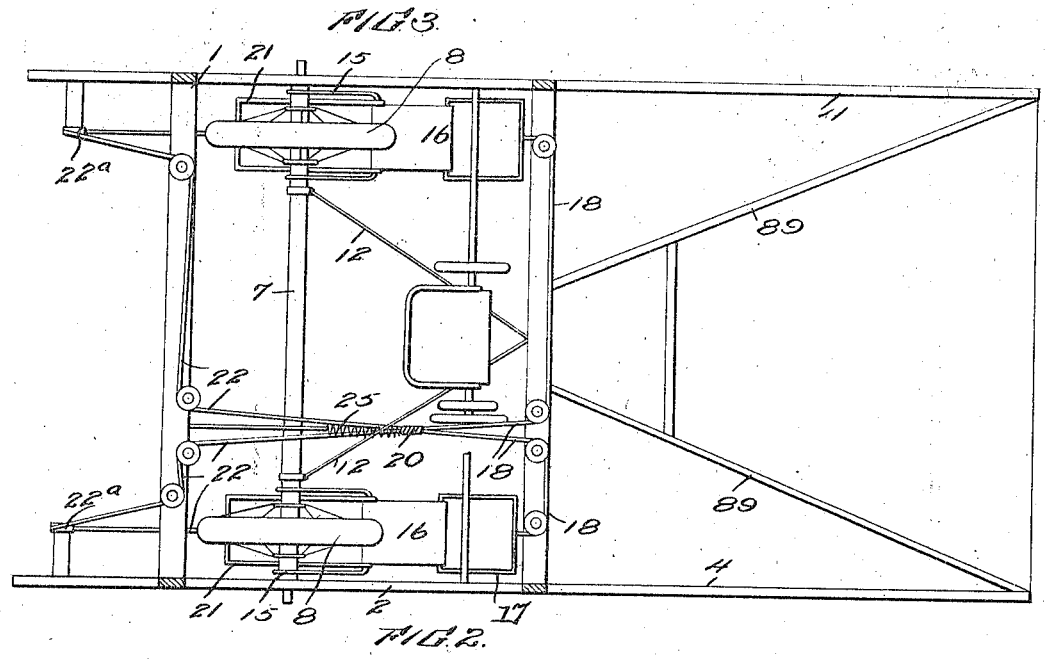
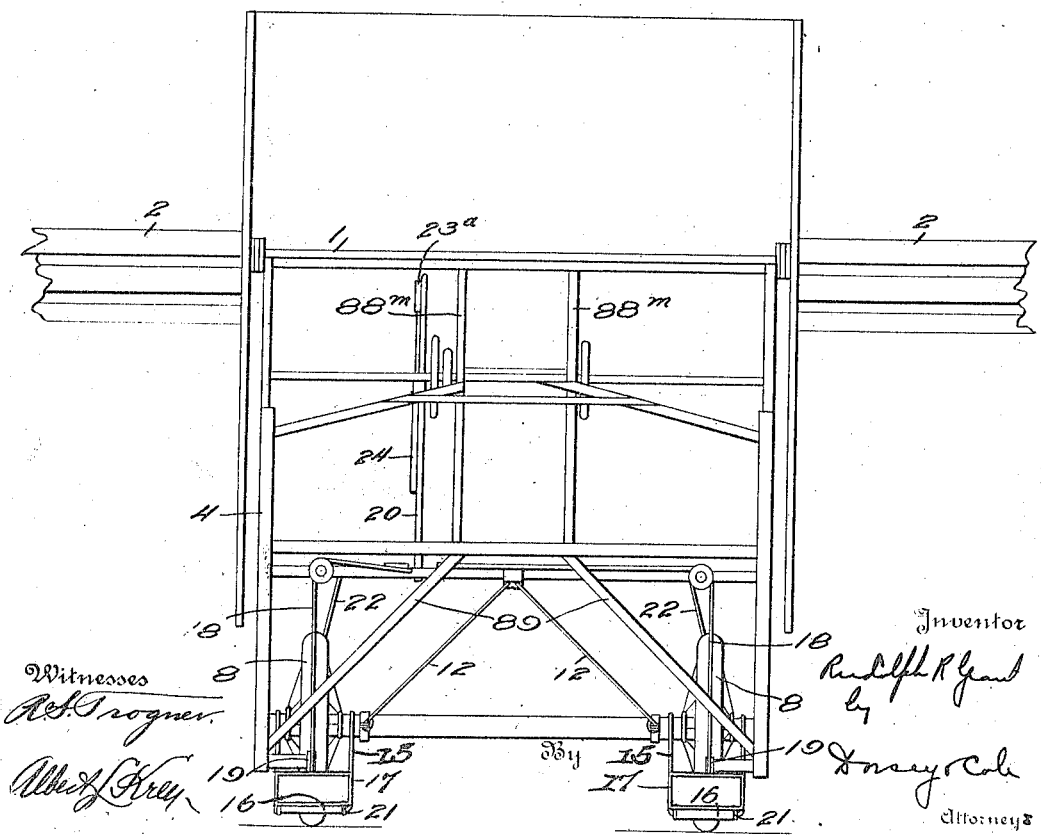

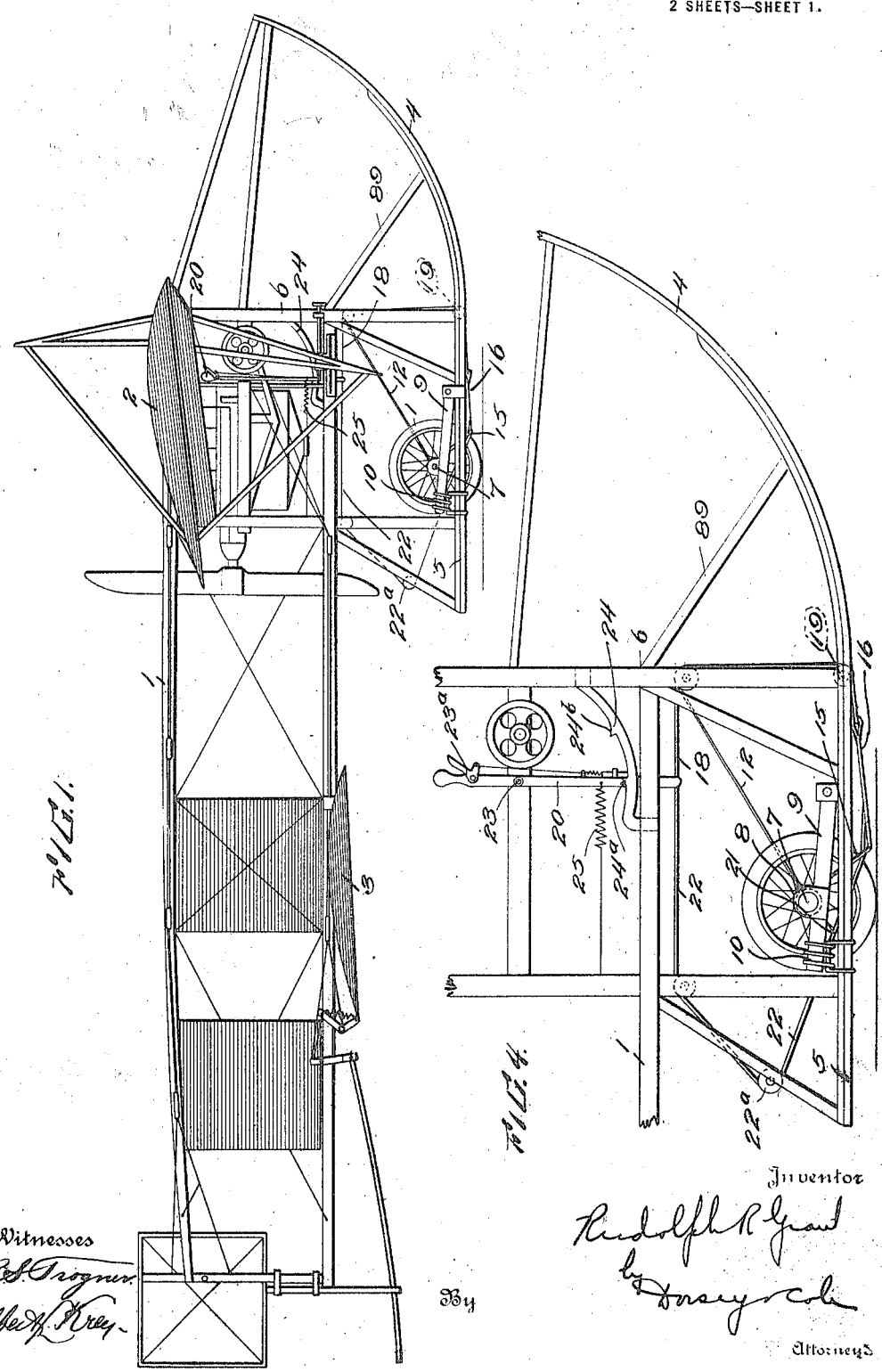

UNITED STATES PATENT OFFICE.

RUDOLPH R. GRANT, OF NORFOLK, VIRGINIA.

LANDING AND LAUNCHING SYSTEM FOR AEROPLANES.

1,263,755.

Specification of Letters Patent.

Patented Apr. 23, 1918.

Application filed October 6, 1913. Serial No. 783,868.

*To all whom it may concern:*

Be it known that I, RUDOLPH R. GRANT, a citizen of the United States of America, and a resident of the city of Norfolk, State of Virginia, have invented certain new and useful Improvements in Landing and Launching Systems for Aeroplanes, of which the following is a specification.

My invention relates to a landing and launching mechanism for an aeroplane, whereby the aviator cannot only arrest the motion of the machine when it has landed but whereby he can also start the machine from the ground without assistance and while in his seat, and in this latter feature it comprises means for so effectually braking the machine that the same will not be driven forward by the thrust of its propeller, and means for releasing such brake. It also comprises an improved skid system for the machine and an improved mounting for the carrying wheels thereof, whereby great flexibility is secured. For these purposes it consists in the construction, arrangement and combination of the several parts of which it is composed as will be hereinafter more fully described and claimed.

Referring to the accompanying drawings in which corresponding parts are designated by corresponding marks of reference:

Figure 1 is a side view of an aeroplane having my improved skid system and landing and launching devices applied thereto.

Fig. 2 is a front view of the skid system and the landing and launching gear.

Fig. 3 is a plan view thereof.

Fig. 4 is a detail view of the latch.

In the drawings 1 represents a fuselage, carrying front supporting surface 2, and rear supporting surface 3, but these are shown merely for the purpose of illustration, and my invention is not restricted to the character of the fuselage or the construction or arrangement of the sustaining surface.

The skid system comprises a forward and a rearward element. The forward element consists of a pair of runners 4, each of which is detachably connected to the corresponding side of the fuselage, the forward ends of the runners being on a curve struck from a center located above and forward of the center of gravity of the machine as will be hereinafter more fully referred to. The rear landing system consists of a pair of skids 5, each of which is detachably connected to the corresponding side of the rear of the fuselage by posts 6.

A truck comprising a transverse axle 7, having on each of its opposite ends a wheel 8, is mounted on the forward landing structure by the links 9, one end of each of which is pivoted to the corresponding runner and the opposite end of which is connected to such runner by a resilient connection 10, such as spring bands. The links receive intermediate of their length the corresponding ends of the axle 7 whereby the resiliency which is necessary to effect a landing without excessive shock is provided for by the power of the springs as modified by the system of levers employed. The wheels 8 are located forwardly of the center of gravity of the machine so that the machine in settling will fall rearwardly and not forwardly. Attached to the axle on the inside of the opposite wheels thereof, are flexible stays 12, which are led diagonally across the front landing system, to which their front ends are attached. The lateral movement of the wheels in landing is resiliently opposed by the springs 10, which tend to draw the wheel back into their proper lateral position, the cross stays forming positive limits for such lateral movement, they being put in with a certain amount of slack. It will be noted that the truck itself is held from slowing, that is to say one wheel is prevented from running ahead of the other by the links 9 which determine the longitudinal relation of the ends of the shaft 4 to the skid.

For the purpose of taking up the pressures from the power plant resulting from landing, posts 88ᵐ are located on each side of the engine within the fuselage between the top and bottom horizontal members thereof, and from the base of such posts, struts 89 are inclined downwardly and outwardly to the skid structure whereby the thrust resulting from the engine in landing are transmitted therethrough to the skid at the point of resistance. The rear posts are slightly farther apart than the front posts.

By striking the curve of the forward ends of the runners 4 from a center located above and forward of the center of gravity of the machine, it will be noted that if a landing should be made head down, and the front of the runners 4 strike the ground, the line of thrust of the machine will be below the center of curvature of the runners 4 and the machine instead of pitching forward over on the front of the runners 4 will settle down at the rear end, bringing the truck wheels to the ground.

In order to provide means for bringing the machine to rest when landing and for holding it at rest when starting and until the motor has been speeded up, which means shall be under control of the aviator when in his seat in the machine I provide the following:

On each end of the axle 7 is mounted a yoke 15, which straddles the corresponding wheel 9 and carries on its outer end the rear end of a band 16, preferably made of canvas, the forward end of the band being connected by a loop 17, to one end of a halyard 18, which is led over a pulley 19 on the runner, and over other suitable pulleys to below the operator's seat, where it is connected with the lower end of a lever 20, the halyards 18 of the yokes of the wheels on the two sides being connected to the same lever. A link 21 has its forward end connected to the outer end of each of the yokes 15, and leading therefrom rearwardly, straddles the lower part of the corresponding wheel, it having its rear end connected to a second halyard 22, passing over suitable pulleys 22ª on the skid and fuselage to the lever 20 to which it is connected.

The lever 20 is pivoted at 23 in the frame, and has its upper end in convenient position to be grasped by the operator, it carrying a hand actuated latch 23ª, the nose of which is adapted to engage shoulders 24ª and 24ᵇ in a fixed sector 24, the lever having its lower end drawn rearwardly by a spring 25, with the nose of the latch against the shoulder 24ª of the sector. This spring also holds the band 16 in front of the wheel. When it is desired to apply the brake, the top of the lever is shoved rearwardly, thereby through the halyard 22 drawing the bands 16 rearwardly and beneath the wheels 8 and between them and the ground, and braking the machine, the bands being locked against further rearward motion by the contact of the latch with the shoulder 24ᵇ. To release the brake, as in starting a flight, the aviator releases the latch from the shoulder 24ᵇ and the thrust of the propeller moves the machine forward whereby the wheels will run from off the bands and rest on the ground in the opening in the loops 17, and will function in the usual manner; as soon as the machine rises the spring 25 will restore the bands to their normal and original position.

Having thus described my invention what I claim is:—

1. In a landing system for flying machines, the combination of skids, of a truck, links pivoted at one end to the skid and intermediately carrying the truck, a resilient connection between the other end of the links and the skids and stays attached to the truck and converging forwardly and attached to the skid system to form stops to aid in preventing slewing of the truck.

2. In an aeroplane the combination with a supporting wheel of a band, means for bringing the band beneath the wheel and arresting it in that position with the wheel resting thereon, and means for permitting rearward movement of the band from that position.

3. In an aeroplane, the combination with a supporting wheel of a band, means for normally holding the band in front of the wheel, means for bringing the band beneath the wheel and arresting it in that position with the wheel resting thereon, and means for permitting rearward movement of the band from that position.

4. In an aeroplane, the combination with a supporting wheel, of a band, means for normally holding the band in front of the wheel, means for bringing the band beneath the wheel and arresting it in that position with the wheels resting thereon, means for permitting rearward movement of the band from that position, and means for returning the band to normal position.

5. In a braking mechanism for a flying machine, the combination with supporting wheels, of a band, means for moving the band to a position beneath the wheels, and means for moving the band to a position in front of the wheels when said wheels are lifted.

In testimony whereof I have signed my name in the presence of two witnesses.

RUDOLPH R. GRANT.

In the presence of—
ROBT. T. LANG,
ALBERT L. KREY.